(12) United States Patent
Abouelleil et al.

(10) Patent No.: US 10,844,965 B2
(45) Date of Patent: Nov. 24, 2020

(54) ANTI-SHOCK CHECK VALVE

(71) Applicant: Mueller International, LLC, Atlanta, GA (US)

(72) Inventors: Ashraf Abouelleil, Oswego, IL (US); Vadim Lorman, Skokie, IL (US)

(73) Assignee: Mueller International, LLC, Atlanta, GA (US)

(*) Notice: Subject to any disclaimer, the term of this patent is extended or adjusted under 35 U.S.C. 154(b) by 117 days.

(21) Appl. No.: 16/166,642

(22) Filed: Oct. 22, 2018

(65) Prior Publication Data
US 2020/0124182 A1 Apr. 23, 2020

(51) Int. Cl.
| | | |
|---|---|---|
| *F16K 1/52* | (2006.01) | |
| *F16K 15/02* | (2006.01) | |
| *F16K 31/22* | (2006.01) | |
| *F16K 27/02* | (2006.01) | |
| *F16K 1/48* | (2006.01) | |

(52) U.S. Cl.
CPC .............. *F16K 1/523* (2013.01); *F16K 1/48* (2013.01); *F16K 15/026* (2013.01); *F16K 27/0209* (2013.01); *F16K 31/22* (2013.01)

(58) Field of Classification Search
CPC ...... F16K 1/523; F16K 27/0209; F16K 31/22; F16K 15/026; F16K 1/48; F16K 15/063; Y10T 137/7932–7935; Y10T 137/3367; Y10T 137/3421; Y10T 137/7835
See application file for complete search history.

(56) References Cited

U.S. PATENT DOCUMENTS

| | | | |
|---|---|---|---|
| 1,710,214 A * | 4/1929 | Hassold | F16K 15/026 137/331 |
| 4,580,596 A * | 4/1986 | Stehling | F16K 15/18 137/523 |
| 6,237,893 B1 * | 5/2001 | Rose | F16K 15/063 251/323 |

* cited by examiner

*Primary Examiner* — Marina A Tietjen
(74) *Attorney, Agent, or Firm* — Taylor English Duma LLP

(57) ABSTRACT

Example aspects of an anti-shock check valve, a valve assembly, and a method for adjusting an anti-shock check valve are disclosed. The anti-shock check valve can comprise a valve body, the valve body defining a cavity, the cavity defining an inlet end an outlet end; a seat positioned within the cavity; and a shaft assembly positioned within the cavity, the shaft assembly comprising a shaft, a collar, and a spring, the collar selectively repositionable along the shaft to adjust a maximum allowable extension length of the spring.

19 Claims, 6 Drawing Sheets

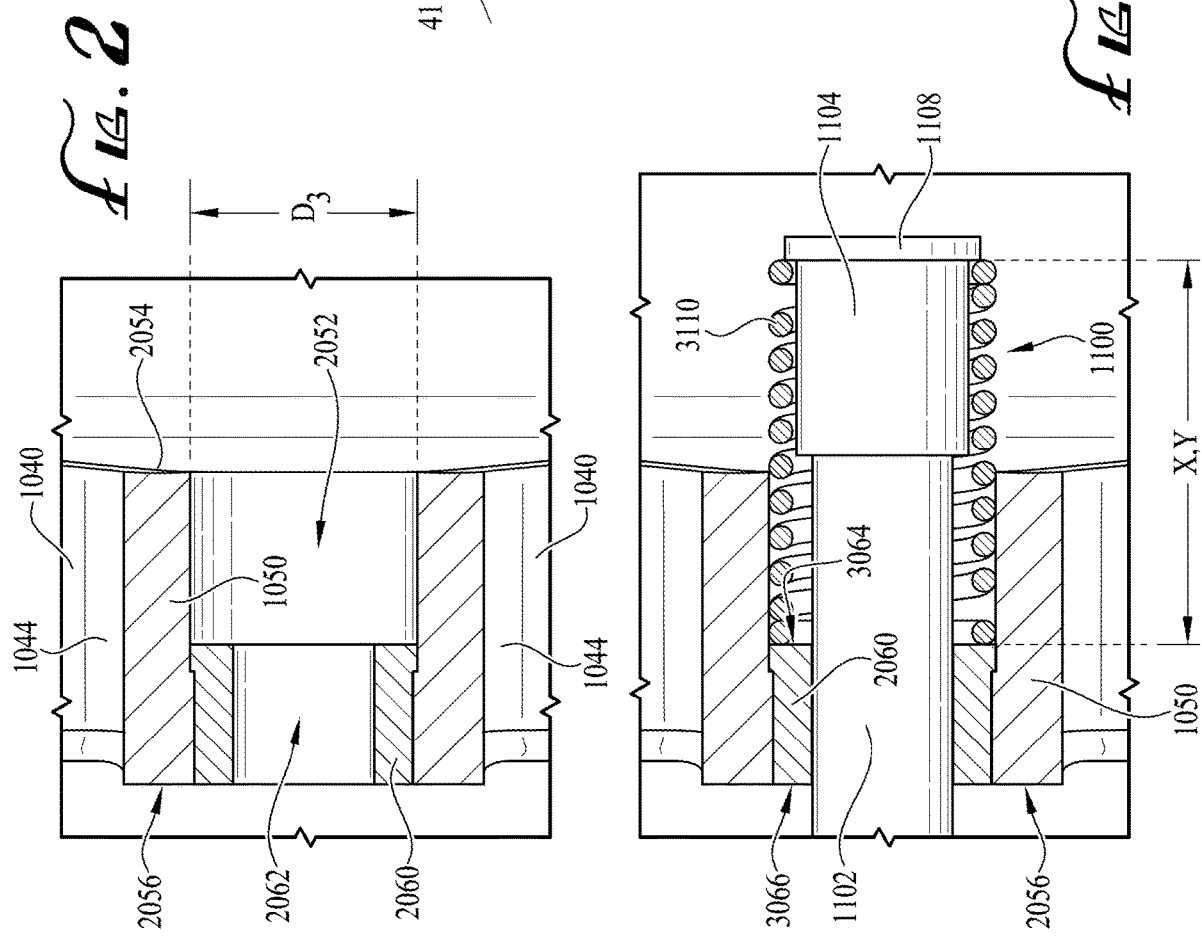

ANTI-SHOCK CHECK VALVE

TECHNICAL FIELD

This disclosure relates to anti-shock check valves. More specifically, this disclosure relates to an anti-shock check valve with adjustable sensitivity.

BACKGROUND

Air/vacuum valves can be installed with fluid transfer pipelines to alleviate air pockets and to prevent vacuums from forming in the pipeline. Air pockets can be formed when air collects in the pipeline and can slow or stop the flow of fluid in the pipeline. Air collected in the pipe can escape through the air/vacuum valve and can be released into the atmosphere to prevent the formation of air pockets. Further, a vacuum can form in a pipeline when the pipeline is drained and/or when the internal pressure of the pipeline drops below atmospheric pressure. Atmospheric air can enter the pipeline through the air/vacuum valve to prevent the formation of a vacuum.

Commonly, air/vacuum valves comprise a body, a channel extending through the body, and a float positioned within the channel. The channel can define an inlet opening and an outlet opening. When the fluid in a pipeline rises, fluid can enter the channel through the inlet opening. The float can be elevated by the rising fluid towards the outlet opening. The float can block the opening when the fluid reaches a critical level, closing the air/vacuum valve. When the air/vacuum valve is closed abruptly, fluid hammer can occur. The surge of pressure resulting from the abrupt cessation of fluid in motion can create a shock wave within the air/vacuum valve and/or pipeline that can cause damage to the air/vacuum valve and/or pipeline.

Check valves can be installed with the air/vacuum valve and pipeline to regulate the flow of fluid into the air/vacuum valve, aiding in the prevention of fluid hammer. Check valves comprise a spring-loaded disc biased away from a seat. When fluid rises into the check valve, pressure is applied to the spring loaded disc, forcing it into engagement with the seat, closing the check valve. Openings can be formed in the disc to allow for a slow and measured flow of fluid into the air/vacuum valve. However, the sensitivity of the spring biasing the disc away from the seat cannot adjusted often is not ideal and cannot be corrected.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is an anti-shock check valve comprising a valve body, the valve body defining a cavity, the cavity defining an inlet end an outlet end; a seat positioned within the cavity; and a shaft assembly positioned within the cavity, the shaft assembly comprising a shaft, a collar, and a spring, the collar selectively repositionable along the shaft to adjust a maximum allowable extension length of the spring.

Also disclosed is a valve assembly comprising a pipe; an air/vacuum valve; and an anti-shock check valve between the pipe and the air/vacuum valve, the anti-shock check valve comprising; a valve body, the valve body defining a cavity, the cavity defining an inlet end an outlet end; a seat positioned within the cavity; and a shaft assembly positioned within the cavity, the shaft assembly comprising a shaft, a collar, a disc, and a spring, the collar selectively repositionable along the shaft to adjust a maximum allowable extension length of the spring, the shaft assembly movable between an open position, wherein the disc is spaced from the seat, and a closed position, wherein the disc is engaged with the seat.

Also disclosed is a method for adjusting an anti-shock check valve comprising the steps of disengaging a collar from a shaft at a first location along the shaft; repositioning the collar along the shaft to adjust a maximum allowable extension length of a spring; and engaging the collar with the shaft at a second location along the shaft.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 2 is a close-up cross-sectional view of a first annular ring and bearing of the anti-shock check valve of FIG. 1.

FIG. 3 is a close-up cross-sectional view of Detail 3 of FIG. 5.

FIG. 4 is a perspective view of a collar of the anti-shock check valve of FIG. 1.

DETAILED DESCRIPTION

Figure 1:
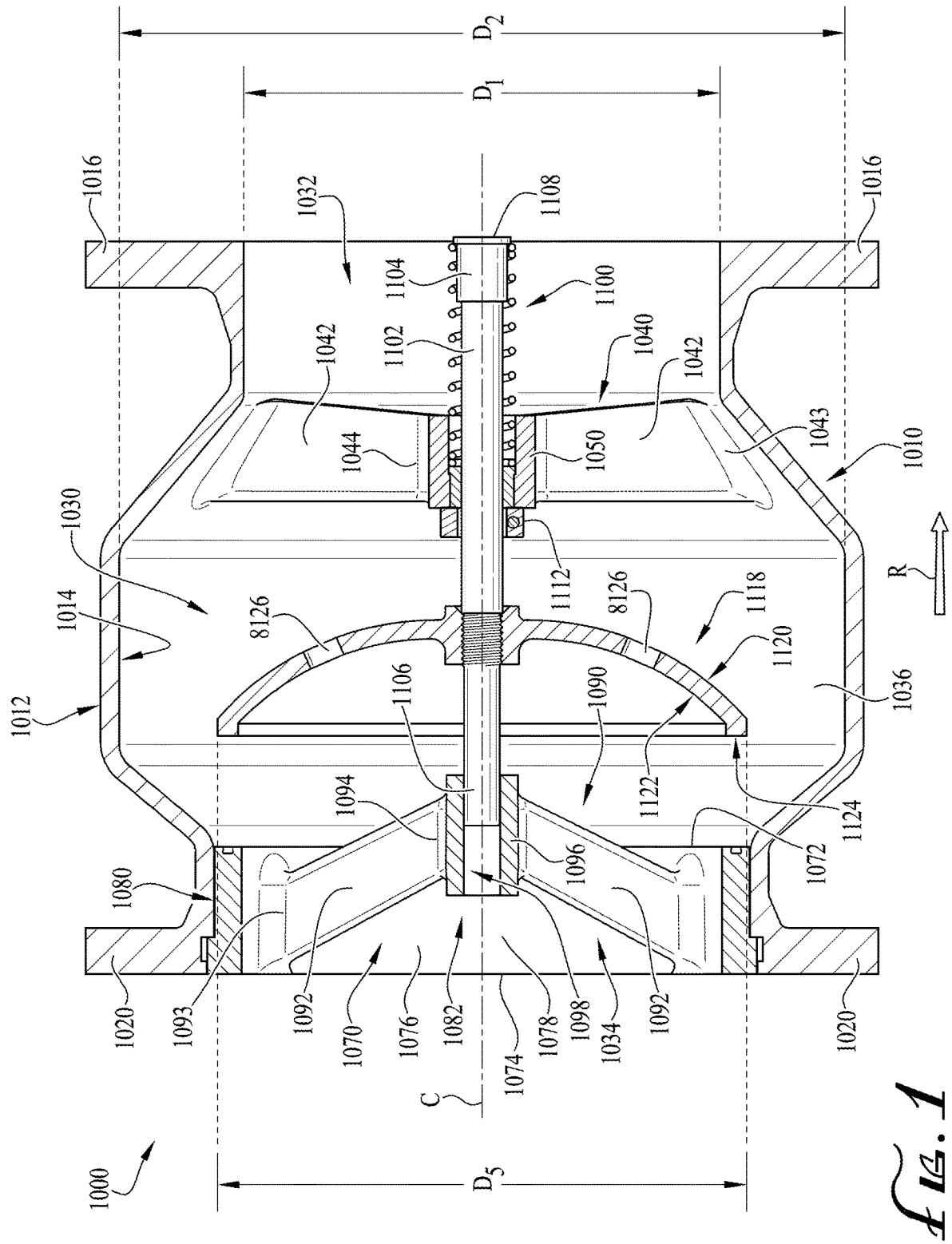
FIG. 1 shows a front cross-sectional view of an anti-shock check valve in an open position, taken along line 1-1 in FIG. 6, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is an anti-shock check valve and associated methods, systems, devices, and various apparatus. Example aspects of the anti-shock check valve can comprise a shaft, a spring, and a disc. The anti-shock check valve can further comprise an adjustable collar, according to example aspects. It would be understood by one of skill in the art that the disclosed anti-shock check valve is described in but a few exemplary aspects among many. No particular terminology or description should be considered limiting on the disclosure or the scope of any claims issuing therefrom.

Figure 6:
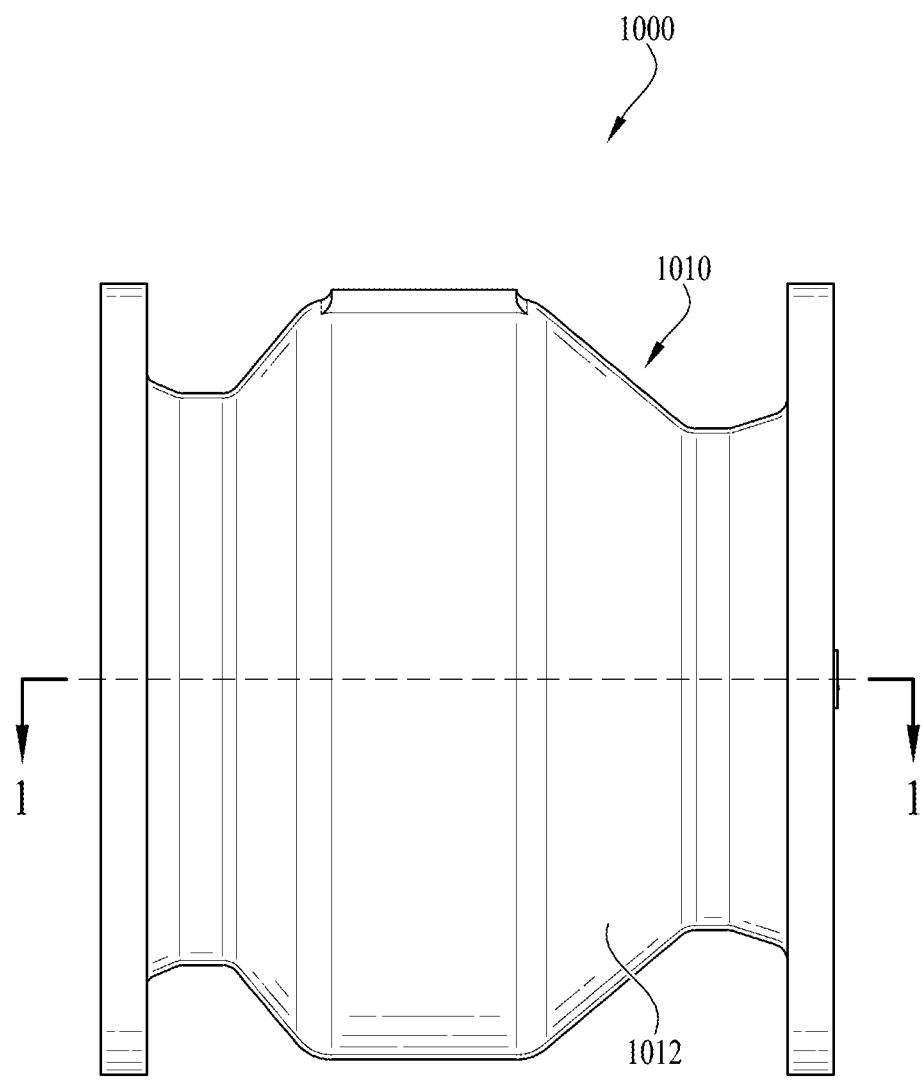
FIG. 6 is a side view of the anti-shock check valve of FIG. 1.

FIG. 1 illustrates a cross-sectional view of a first aspect of an anti-shock check valve 1000 in an open position, according to the present disclosure. As shown, the anti-shock check valve 1000 can comprise a body 1010. The body 1010 can comprise an outer surface 1012 and an inner surface 1014, and the inner surface can define a cavity 1030. The cavity 1030 can define an inlet end 1032, outlet end 1034, and a central region 1036. As shown, according to example aspects, a diameter $D_1$ of the inlet and outlet ends 1032,1034 of the cavity 1030 can be substantially equal. In some aspects, a diameter $D_2$ of the central region 1036 can be greater than the diameter $D_1$ of the inlet and outlet end 1032,1034, as shown. Example aspects of the body 1010 can comprise an inlet flange 1016 adjacent to the inlet end 1032 of the cavity 1030 and an outlet flange 1020 adjacent to the outlet end 1034 of the cavity 1030. According to example aspects, the body 1010 can be formed from an iron material, such as, for example, ductile iron. Other example aspects of the body 1010 can be formed from cast iron, steel, carbon, bronze, another metal material, plastic, or any other suitable material known in the art. FIG. 6 illustrates a side view of the anti-shock check valve 1000, showing the outer surface 1012 of the body 1010.

Figure 7:
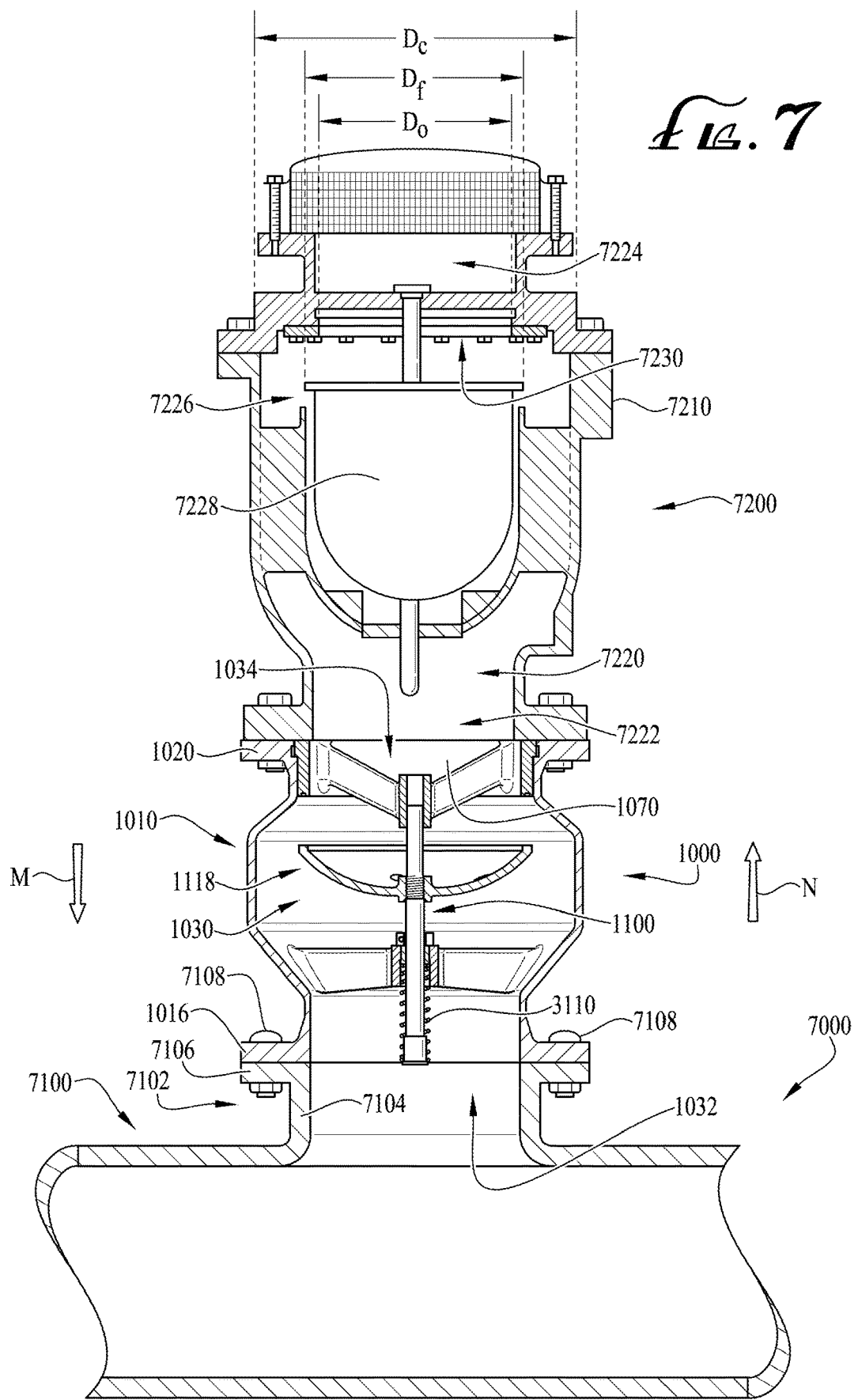
FIG. 7 is a front, cross-sectional view of the anti-shock check valve of FIG. 1 attached to an air/vacuum valve and a pipe.

The anti-shock check valve 1000 can be attached, connected, or otherwise mounted to a piping system 7000. The piping system 7000 can be configured to transport liquids. In example aspects, as shown in FIG. 7, the anti-shock check valve 1000 can be positioned between a pipe 7100 of the piping system 7000 and an air/vacuum valve 7200. For example, the inlet flange 1016 of the body 1010 can be attached to the pipe 7100 and the outlet flange 1020 of the body 1010 can be attached to the air/vacuum valve 7200. In one example aspect, the piping system 7000 can comprise a tee 7102 defining a branch 7104 extending from the pipe 7100. The branch 7104 can comprise a mounting flange 7106 distal from the pipe 7100. The mounting flange 7106 can be mounted to the inlet flange 1016 of the anti-shock check valve 1000, as shown. In example aspects, one or more fasteners 7108 can couple the mounting flange 7106 to the inlet flange 1016. The fastener 7108 can be, for example, a nut and bolt assembly, as shown, or any other suitable fastener known in the art.

Figure 8:
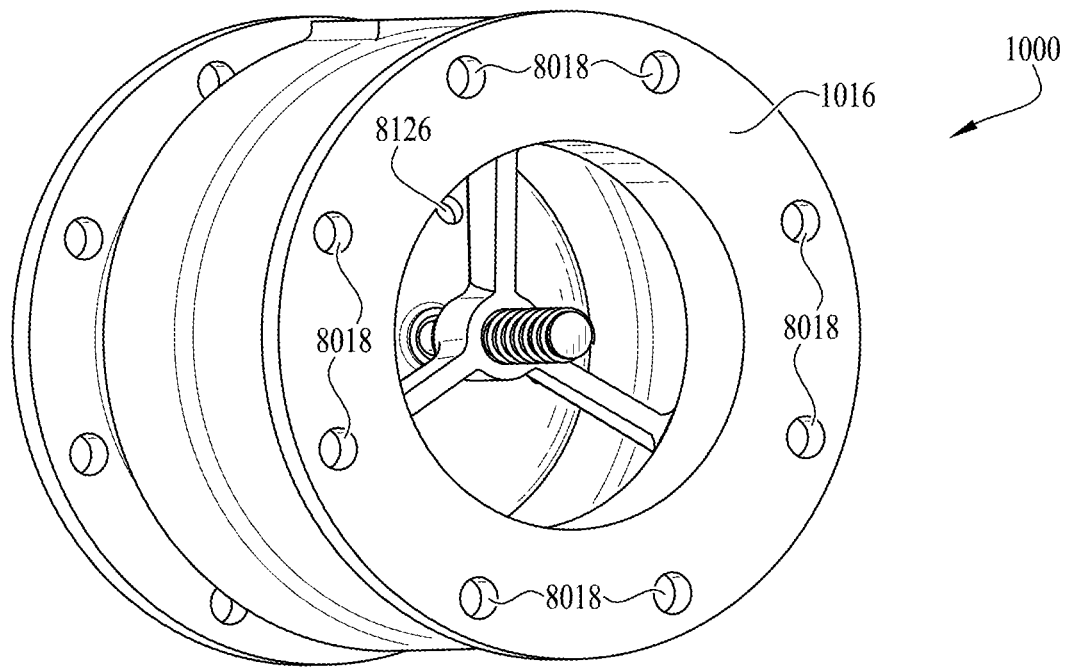
FIG. 8 is a perspective view of an inlet end of the anti-shock check valve of FIG. 1.
Figure 9:
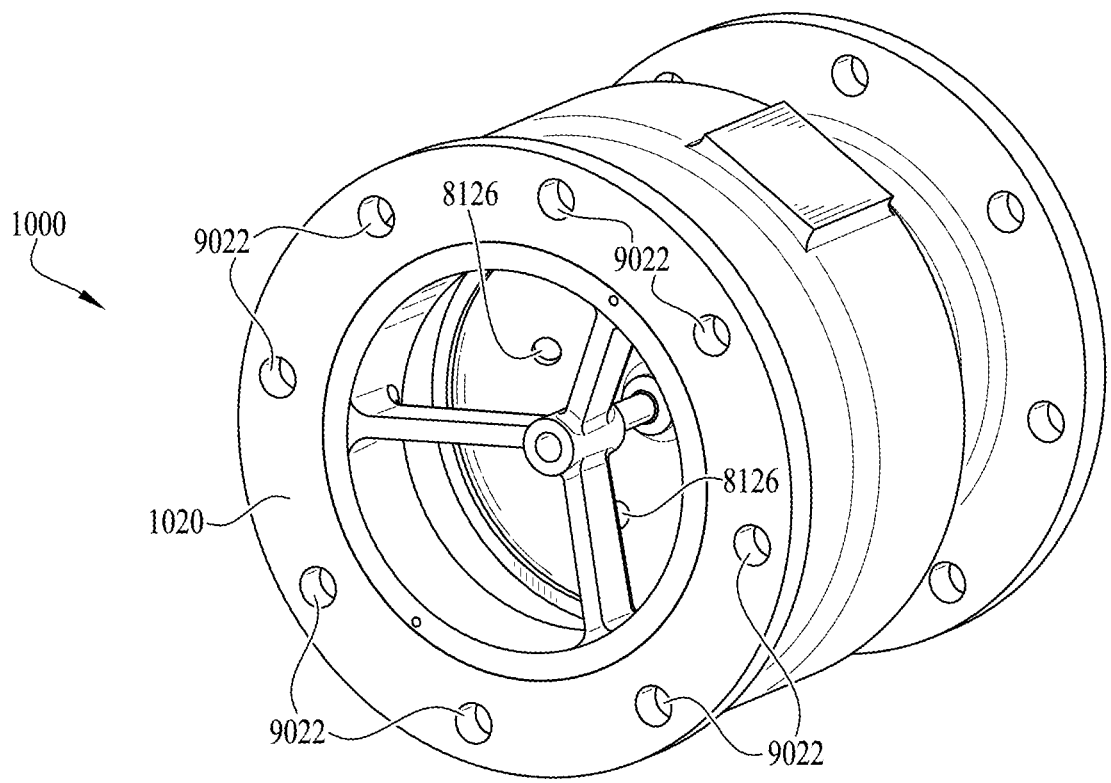
FIG. 9 is a perspective view of an outlet end of the anti-shock check valve of FIG. 1.

As shown in FIG. 8, the inlet flange 1016 of the body 1010 can include mounting bores 8018 for mounting the inlet flange 1016 to the mounting flange 7106 (shown in FIG. 7) of the tee 7102. Example aspects of the mounting flange 7106 can also include mounting bores (not shown) configured to align with the mounting bores 8018 of the anti-shock check valve 1000. The one or more fasteners 7108 (shown in FIG. 7) can extend through the mounting bores 8018 of the inlet flange 1016 and the mounting bores of the mounting flange 7106 to couple the inlet flange 1016 to the mounting flange 7106. As shown in FIG. 9, the outlet flange 1020 can include mounting bores 9022 for mounting the outlet flange 1020 to the air/vacuum valve 7200.

Referring again to FIG. 7, example aspects of the air/vacuum valve 7200 can comprise a body 7210 defining an interior cavity 7220. The cavity 7220 can define an inlet end 7222, an outlet end 7224, and a central region 7226 therebetween. A float 7228 can be oriented within the central region 7226 of the cavity 7220. Further, an opening 7230 can be formed between the central region 7226 and the outlet end 7224. In example aspects, a diameter $D_o$ of the opening 7230 can be less than a diameter $D_c$ of the central region 7226. Further, a diameter $D_f$ of the float 7228 can be less than the diameter of $D_c$ of the central region 7226 and greater than the diameter $D_o$ of the opening 7230, as shown. The air/vacuum valve 7200 can be connected to the anti-shock check valve 1000 such that the inlet end 7222 of the air/vacuum valve 7200 can be oriented proximate to the outlet end 1034 of the anti-shock check valve 1000. Further, the air/vacuum valve 7200 can be oriented such that the opening 7230 between the central region 7226 and outlet end 7224 can be positioned above the float 7228, relative to the orientation shown. In other aspects, the air/vacuum valve 7200 can be formed as any other suitable type of air/vacuum valve or air valve. Example aspects of the float 7228 can be movable between a lowered position, as shown in FIG. 7, wherein the float 7228 is spaced from the opening 7230, and a raised positioned, wherein the float 7228 abuts and blocks the opening 7230.

In normal operation, air can flow through the cavity 1030 in the anti-shock check valve 1000 between the pipe 7100 and the air/vacuum valve 7200. For example, in forward air flow conditions, air in the pipe 7100 can flow through the cavity 1030 of the anti-shock check valve 1000 and into the air/vacuum valve 7200, where it can be released into the atmosphere. Releasing air collected in the piping system 7000 can prevent air pockets from forming. Air pockets can slow the flow of fluid in the piping system 7000 or can create an air lock which can stop the flow of fluid completely. In some example aspects, the anti-shock check valve 1000 and air/vacuum valve 7200 can be connected to the pipe 7100 at a high point in the piping system 7000, as air tends to collect at the high points. Furthermore, in reverse air flow conditions, air from the atmosphere can flow into the air/vacuum valve 7200, through the cavity 1030 of the anti-shock check valve 1000, and into the pipe 7100. Allowing air to enter the piping system 7000 can prevent a vacuum from forming when the pipe 7100 or piping system 7000 is being drained. A vacuum created in the pipe 7100 can cause the pipe 7100 to collapse. In some example aspects, the anti-shock check valve 1000 can be connected to the pipe 7100 adjacent to any quick-closing valve (for example, the air/vacuum valve 7200 disclosed herein) in the piping system 7000 where a vacuum can be formed when the quick-closing valve is closed.

As will be discussed in further detail below, fluid levels in the piping system 7000 can rise and fluid can enter the cavity 1030 of the anti-shock check valve 1000. Example aspects of the inner surface 1014 of the body 1010 can be coated with a coating (not shown), such as, for example, an epoxy film, to prevent fluid in the anti-shock check valve 1000 from contacting the material used to form the body 1010.

As illustrated in FIG. 1, the body 1010 of the anti-shock check valve 1000 can further comprise a body vane assembly 1040 positioned within the cavity 1030. In some aspects, the body vane assembly 1040 can be positioned within the central region 1036 of the cavity 1030, as shown. In other aspects, the body vane assembly 1040 can be positioned within the inlet end 1032 of the cavity 1030. The body vane assembly 1040 can comprise a plurality of body vanes 1042. Each of the body vanes 1042 can define a proximal end 1043 joined to the inner surface 1014 of the body 1010 and can extend therefrom towards a centerline C of the cavity 1030. Each of the body vanes 1042 can further define a distal end 1044 that can be joined to a first annular ring 1050. According to example aspects, the body vanes 1042 and first annular ring 1050 can be integrally formed with the body 1010, such that the body vane assembly 1040 and body 1010 are formed as a single monolithic structure. In other aspects, the body vane assembly 1040 or portions thereof can be formed separately from the body 1010.

FIG. 2 illustrates an example aspect of the first annular ring 1050. As shown, the first annular ring 1050 can define a first bore 2052 extending therethrough. A bearing 2060 can be positioned within the first bore 2052. The bearing 2060 can define an opening 2062 extending therethrough and can reduce the diameter $D_3$ of the first bore 2052 at the location of the bearing 2060. As shown, the first annular ring 1050 can define a front end 2054 and a back end 2056. In example aspects, the bearing 2060 can be positioned within the first annular ring 1050 proximate to the back end 2056. Moreover, according to example aspects, the first bore 2052 and the opening 2062 in the bearing 2060 can be substantially concentric to one another and to the cavity 1030 (shown in FIG. 1).

Referring back to FIG. 1, example aspects of the anti-shock check valve 1000 can further comprise an annular seat 1070. The annular seat 1070 can be positioned within the outlet end 1034 of the cavity 1030, as shown, and proximate to the outlet flange 1020 of the body 1010. Other example aspects of the annular seat 1070 can be positioned within the central region 1036 of the cavity 1030. The seat 1070 can define a first annular edge 1072, a second annular edge 1074, and an intermediate section 1076 extending therebetween. The seat 1070 further can define an inner surface 1078 and an outer surface 1080. According to example aspects, the outer surface 1080 of the seat 1070 can engage the inner surface 1014 of the body 1010, and the inner surface 1078 of the seat 1070 can define a generally cylindrical channel 1082. According to example aspects, the channel 1082 of the seat 1070 can be substantially concentric to the cavity 1030 of the body 1010. According to example aspects, the annular seat 1070 can be formed from a resilient material such as, for example, a rubber material, and in some aspects can be formed from EPDM rubber. In other aspects, the annular seat 1070 can be formed from Buna-N, PTFE, Viton, neoprene, or any other suitable material known in the art.

The seat 1070 can further comprise a seat vane assembly 1090. The seat vane assembly 1090 can comprise a plurality of seat vanes 1092 extending from the inner surface 1078 of the seat 1070 towards the centerline C of the cavity 1030. In some example aspects, the seat vanes 1092 can be angled towards the central region 1036 of the cavity 1030. According to example aspects, a proximal end 1093 of each of the seat vanes 1092 can be joined with the inner surface 1078 of the intermediate section 1076 of the seat 1070, and a distal end 1094 of each of the seat vanes 1092 can be joined with a second annular ring 1096. Example aspects of the second annular ring 1096 can define a second bore 1098 therethrough. As shown, the second bore 1098 can be concentric to the cavity 1030 and to the cylindrical channel 1082 defined by the seat 1070. In some example aspects, the seat vanes 1092 and second annular ring 1096 can be integrally formed with the seat 1070, such that the seat vane assembly 1090 and seat 1070 are formed as a single monolithic structure. In other aspects, the seat vane assembly 1090 or portions thereof can be formed separately from the seat 1070.

Example aspects of the anti-shock check valve 1000 can further comprise a shaft assembly 1100. The shaft assembly 1100 can comprise a shaft 1102 positioned within the cavity 1030 and generally extending along the centerline C of the cavity 1030. Thus, example aspects of the shaft 1102 can be oriented concentric to the cavity 1030. The shaft 1102 can extend through the first bore 2052 of first annular ring 1050 and through the opening 2062 of the associated bearing 2060. The shaft 1102 can further extend through the second bore 1098 of the second annular ring 1096. Example aspects of the shaft 1102 can be slidable with respect to the first annular ring 1050, bearing 2060, and second annular ring 1096. Thus, the shaft 1102 can be configured to slidably move along the centerline C of the cavity 1030. The shaft 1102 can define a first end 1104 proximate the inlet end 1032 of the cavity 1030 and a second end 1106 proximate the outlet end 1034 of the cavity 1030. Moreover, example aspects of the shaft 1102 can comprise a cap 1108 located at the first end 1104 of the shaft 1102.

Figure 5:
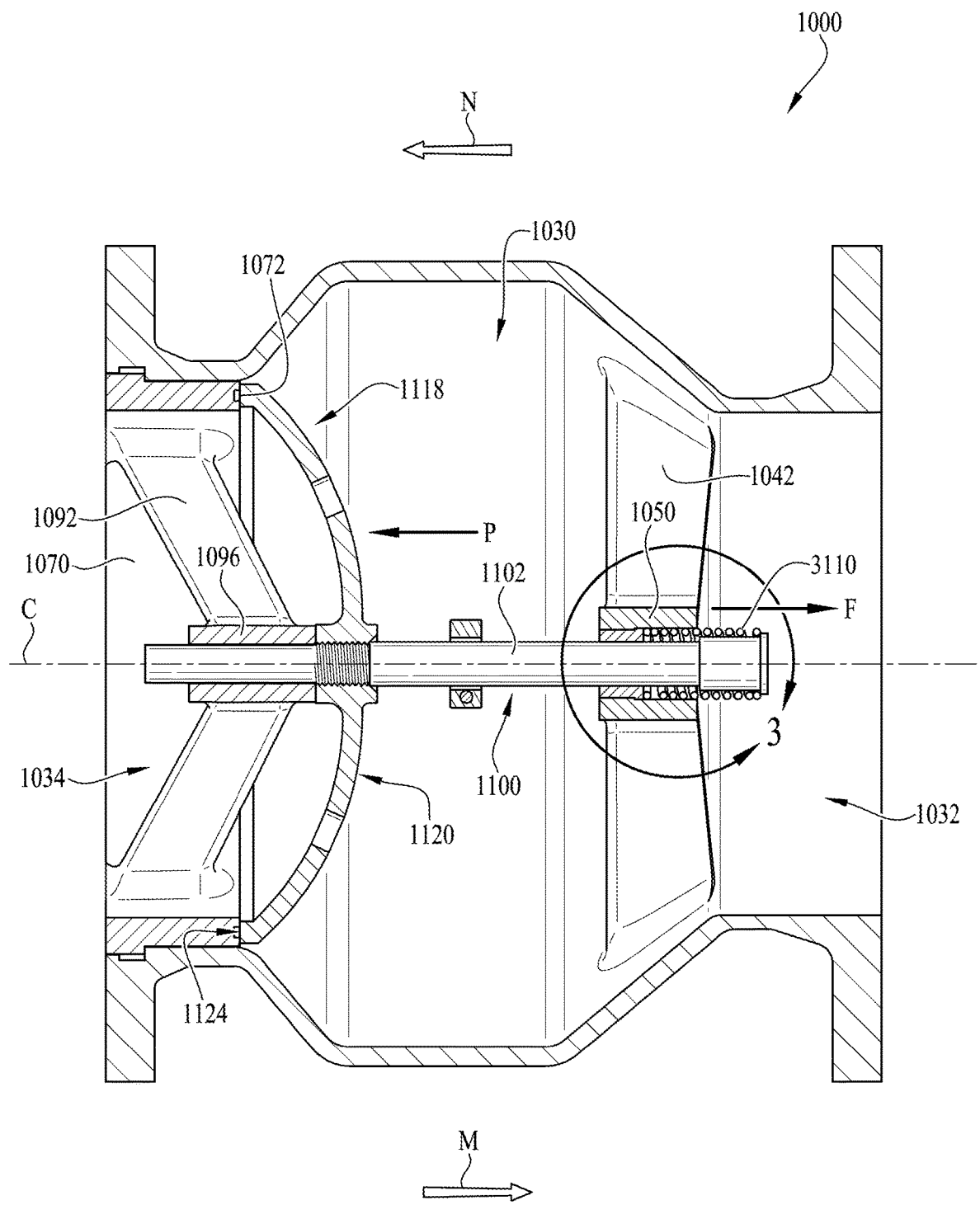
FIG. 5 is shows a front cross-sectional view of the anti-shock check valve of FIG. 1 in a closed position, taken along line 1-1 in FIG. 6.

FIG. 3 illustrates a close-up view of the shaft 1102 extending through the first annular ring 1050 and the corresponding bearing 2060. As shown, the bearing 2060 can define a front end 3064 and a back end 3066. In example aspects, the back end 3066 of the bearing 2060 can be substantially aligned with the back end 2056 of the first annular ring 1050. A portion of the shaft 1102 can extend from the front end 3064 of the bearing 2060 and can terminate at the first end 1104 of the shaft 1102, and a portion of the shaft 1102 can extend from the back end 3066 of the bearing 2060 and can terminate at the second end 1106 (shown in FIG. 1) of the shaft 1102. According to example aspects, the shaft assembly 1100 can further comprise a spring 3110 mounted to the shaft 1102. In example aspects, as shown, the spring 3110 can be a compression spring 3110. In other aspects, the spring 3110 can be, for example, an extension spring, a torsion spring, or any other suitable type of spring. As shown, the spring 3110 can extend between the cap 1108 at the first end 1104 of the shaft 1102 and the front end 3064 of the bearing 2060. The shaft assembly 1100 can be movable between a first configuration, as shown in FIGS. 1 and 3, wherein the spring 3110 is extended to a maximum allowable extension length Y, and a second configuration, as shown in FIG. 5, wherein the spring 3110 is compressed. According to example aspects, the spring 3110 can bias the shaft assembly 1100 to the first configuration. It can be said the anti-shock check valve 1000 is in an open position in the first configuration and a closed position in the second configuration. As shown, the spring 3110 can bias the shaft assembly 1100 generally in the direction R. In example aspects, the direction R can extend substantially parallel to the centerline C of the cavity.

As shown in FIG. 1, the shaft assembly 1100 can further comprise a collar 1112 mounted to the shaft 1102. The collar 1112 can be coupled to the shaft 1102 between the bearing 2060 and the second end 1106 of the shaft 1102. FIG. 4 illustrates an example aspect of a collar 1112, according to the present disclosure. As shown, the collar 1112 can comprise a generally annular body 4113 comprising a first end 4118 and second end 4120. The first and second ends 4118,4120 can face one another and define a minimal space 4122 therebetween. The annular body 4113 can further define an annular opening 4114 therethrough, thereby defining a split ring shape. The shaft 1102 (shown in FIG. 1) can be configured to extend through the opening 4114. The collar can further comprise a hinge 4115 formed in the annular body 4113. In example aspects, the hinge 4115 can be located substantially opposite the first and second ends 4118,4120. The hinge 4115 can allow for flexibility of the annular body 4113, such that a diameter D4 of the annular opening 4114 can be selectively increased and decreased. The collar 1112 can include a fastener, such as a set screw 4116, for tightening the collar 1112 around the shaft 1102. According to example aspects, the set screw 4116 can be selectively tightened and loosened by a user (for example, the manufacturer of the anti-shock check valve 1000 or a consumer of the check valve 1000, etc). When the set screw 4116 is tightened, the annular body 4113 can flex at the hinge 4115 and the first and second ends 4118,4120 can move towards one another, reducing the space 4122 therebetween. Thus, the diameter $D_4$ of the collar 1112 can decrease, clamping the shaft 1102 within the collar 1112. When the set screw 4116 is loosed, the diameter $D_4$ of the collar 1112 can increase, unclamping the collar 1112 from the shaft 1102. With the collar 1112 unclamped from the shaft 1102, the collar 1112 can be re-positioned along the shaft 1102 to a desired location by a user.

Referring again to FIG. 1, when the shaft assembly 1100 is in the first configuration, the collar 1112 can abut the back end 3066 (shown in FIG. 3) of the bearing 2060 and the back end 2056 of the first annular ring 1050. Thus, in the first configuration, the shaft 1102 can be prevented from sliding further towards the inlet end 1032 of the cavity 1030, and the spring 3110 can be prohibited from further extension. A maximum distance X (shown in FIG. 3) between the front end 3064 of the bearing 2060 and the cap 1108 can be defined in the first configuration, and the maximum distance X can define the maximum allowable extension length Y of the spring 3110. As shown, in example aspects, the maximum distance X can substantially equal the maximum allowable extension length Y. According to example aspects, in the first configuration wherein the spring 3110 is extended to its maximum allowable extension length Y, the cap 1108 and the bearing 2060 can apply an initial compression force Z to the spring 3110. Thus, the position of the collar 1112 along the shaft 1102 can determine the maximum allowable extension length Y of the spring 3110 and the initial compression force Z applied to the spring 3110 in the first configuration.

Aspects of the shaft assembly 1100 wherein the collar 1112 is positioned on the shaft 1102 at a location closer to the cap 1108 can define a lesser maximum allowable extension length Y of the spring 3110. Aspects defining a lesser maximum allowable extension length Y of the spring 3110 can comprise a greater initial compression force Z on the spring 3110, and therefore, a greater force can be required to further compress the spring 3110. Other aspects of the shaft assembly 1100 wherein the collar 1112 is positioned further from the cap 1108 can define a larger maximum allowable extension length Y of the spring 3110. Aspects defining a larger maximum allowable extension length Y can comprise a lesser initial compression force Z on the spring 3110, and therefore, a lesser force can be required to further compress the spring 3110.

The shaft assembly 1100 can further comprise a disc 1118 mounted to the shaft 1102. As shown, the disc 1118 can be positioned on the shaft 1102 between the collar 1112 and the second end 1106 of the shaft 1102, and between the body and seat vane assemblies 1040,1090. In example aspects, the disc 1118 can define a substantially hollow hemispherical shape, and can comprise an outer surface 1120, an inner surface 1122, and an annular edge 1124 formed therebetween. The disc 1118 can further comprise one or more holes 8126 (also shown in FIG. 8) extending from the outer surface 1120 to the inner surface 1122. When the shaft assembly 1100 is in the first configuration, as shown in FIG. 1, the disc 1118 can be spaced apart from the seat 1070, as shown. Further, the disc 1118 can be oriented within the central region 1036 of the cavity 1030. According to example aspects, the diameter $D_5$ of the disc 1118 can be less than the diameter $D_2$ of the central region 1036. Thus, in the first configuration, air can flow into the inlet end 1032 of the cavity 1030, flow around the disc 1118 in the central region 1036 of the cavity 1030, and flow out of the outlet end 1034 of the cavity 1030. Air can also flow through the holes 8126 (shown in FIG. 8) formed in the disc 1118. Thus, air from the pipe 7100 (shown in FIG. 7) can flow through the anti-shock check valve 1000 and into the air/vacuum valve 7200 (shown in FIG. 7), where it can be released into the atmosphere. Example aspects of the disc 1118 can be formed from a resilient material such as, for example, a rubber material, and in some aspects can be formed from EPDM rubber. In other aspects, the disc 1118 can be formed from Buna-N, PTFE, Viton, neoprene, or any other suitable material known in the art.

FIG. 5 illustrates the shaft assembly 1100 in the second configuration, wherein the spring 3110 is compressed beyond the initial compression of the spring 3110 in the first configuration. As mentioned above, fluid levels in the piping system 7000 (shown in FIG. 7) can rise, causing fluid to enter the cavity 1030 of the anti-shock check valve 1000 at its inlet end 1032. The fluid can flow from the inlet end 1032 of the cavity 1030 to the outlet end 1034 of the cavity 1030 in the general direction N. The direction N can be substantially opposite the direction R (shown in FIG. 1) in which the spring 3110 biases the shaft assembly 1100. The rising fluid can apply a pressure P to the outer surface 1120 of the disc 1118 and to the other components of the shaft assembly 1100 in the general direction N. If the pressure P applied to the shaft assembly 1100 is great enough, the pressure P can overcome the force F of the spring 3110, causing the spring 3110 to compress.

In some flow conditions, the pressure P can be minimal. For example, the pressure P resulting from a slow and/or gentle flow of fluid into the cavity may not be great enough to overcome the force F of the spring. However, in other flow conditions, such as where the flow of fluid into the cavity is rapid and/or turbulent, the pressure P can be great enough to overcome the force F of the spring. In instances where the fluid flow is turbulent, example aspects of the body vanes 1042 and seat vanes 1092 can aid in reducing the turbulence of the fluid as it flows through the cavity 1030. Fluid turbulence can cause vibrations that can result in failure of the anti-shock check valve 1000 and/or the air/vacuum valve 7200 (shown in FIG. 7). Thus, reducing the turbulence of the fluid can reduce the likelihood of valve failure.

The pressure P of the fluid flow can overcome the force F of the spring 3110 and can cause the spring 3110 to compress. When the spring is compressed 3110, the pressure P on the shaft assembly 1100 can cause the shaft to slide 1102 within the first and second annular rings 1050, 1096 in the general direction N, moving the shaft assembly 1100 towards the outlet end 1034 of the cavity 1030. As the shaft assembly 1100 moves towards the outlet end 1034, the disc 1118 can move towards the seat 1070. According to example aspects, in the second configuration, as shown, the annular edge 1124 of the disc 1118 can engage the first annular edge 1072 of the seat 1070 to create a seal therebetween, prohibiting fluid from flowing around the disc 1118. However, fluid can continue to flow through the holes 8126 (shown in FIG. 8) formed in the disc 1118 at a slow and measured rate.

As discussed above, the position of the collar 1112 on the shaft 1102 can be adjusted as desired, and thus, the initial compression of the spring 3110 can be adjusted as desired. Adjusting the initial compression of the spring 3110 can adjust the amount of force (e.g., pressure P from fluid flow) required to overcome the force F of the spring 3110 and to move the shaft assembly 1100 from the first configuration to the second configuration.

Referring now to FIG. 7, slowing and controlling the rate at which fluid enters the air/vacuum valve 7200 can prevent fluid hammer (e.g., water hammer) from occurring in the air/vacuum valve 7200. Fluid hammer can occur when the air/vacuum valve 7200 abruptly closes and causes the fluid flowing into the air/vacuum valve 7200 to stop abruptly. The surge of pressure resulting from the abrupt cessation of fluid in motion can create a shock wave within the air/vacuum valve 7200 and/or pipe 7100 that can cause damage to the air/vacuum valve 7200 and/or pipe 7100. Thus, the anti-shock check valve 1000 can serve to prevent fluid hammer resulting in damaging shock waves. As fluid flows into the cavity 7220 of the air/vacuum valve 7200 at the slow and measured rate, the rising fluid can slowly elevate the float 7228 toward the opening 7230 between the central region 7226 and outlet end 7224. As described above the diameter $D_f$ of the float 7228 can be greater than the diameter $D_o$ of the opening 7230, and thus, when the float 7228 reaches the opening 7230 in the raised position, the float 7228 can block the opening 7230, prohibiting the flow of fluid through the opening 7230 from the central region 7226 to the outlet end 7224.

As the flow of fluid from the pipe 7100 into the anti-shock check 1000 valve slows, the pressure on either side of the disc 1118 can begin to equalize, and the pressure P applied to the shaft assembly 1100 by the fluid can be reduced. When the pressure P drops too low to overcome the force F of the spring 3110, the spring 3100 can bias the shaft assembly 1100 back to the first configuration, wherein the disc 1118 is spaced apart from the seat 1070. As the fluid level in the pipe drops, fluid in the air/vacuum valve 7200 can flow into the anti-shock check valve in a reverse direction M, from the outlet end 1034 to the inlet end 1032, and back into the pipe 7100. Further, as the fluid evacuates the air/vacuum valve 7200, the float 7228 can be lowered away from the opening 7230, allowing air to flow into the air/vacuum valve 7200 from the atmosphere. Thus, with the shaft assembly 1100 returned to the first configuration and the float 7228 returned to the lowered position, air can once again flow between the pipe 7100 and the air/vacuum valve 7200, as needed.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An anti-shock check valve comprising:
   a valve body, the valve body defining a cavity, the cavity defining an inlet end and an outlet end;
   a seat positioned within the cavity;
   a shaft assembly positioned within the cavity, the shaft assembly comprising a shaft, a collar, and a spring, the collar selectively repositionable along the shaft to adjust a maximum allowable extension length of the spring; and
   a hemispherical disc mounted on the shaft, the shaft extending through a center of the disc, the disc defining a hemispherical outer surface, a hemispherical inner surface, and an annular edge extending between the outer surface and the inner surface, the annular edge abutting the seat in a closed position.

2. The anti-shock check valve of claim 1, the seat comprising a first annular edge, a second annular edge, and an intermediate section therebetween, wherein the annular edge of the disc abuts the first annular edge of the seat in the closed position.

3. The anti-shock check valve of claim 1, the seat positioned adjacent to the outlet end of the cavity.

4. The anti-shock check valve of claim 1, the disc comprising a hole extending from the outer surface to the inner surface.

5. The anti-shock valve of claim 1, the shaft assembly movable between an open position, wherein the disc is spaced from the seat, and the closed position, wherein the disc is engaged with the seat.

6. The anti-shock check valve of claim 5, the spring biasing the shaft assembly to the open position.

7. The anti-shock check valve of claim 1, further comprising a body vane assembly, the body vane assembly comprising a body vane, the body vane defining a proximal end joined with the valve body and a distal end joined with a first annular ring, the first annular ring defining a first bore therethrough.

8. The anti-shock check valve of claim 7, a bearing positioned within the first bore, the bearing defining an opening therethrough, the shaft configured to extend through the first bore and the opening.

9. The anti-shock check valve of claim 8, the shaft comprising a cap, the spring disposed on the shaft between the cap and the bearing.

10. The anti-shock check valve of claim 1, further comprising a seat vane assembly, the seat vane assembly comprising a seat vane, the seat vane defining a proximal end joined with the seat and a distal end joined with a second annular ring, the second annular ring defining a second bore therethrough, the shaft configured to extend through the second bore.

11. The anti-shock check valve of claim 1, an inlet flange extending from the valve body adjacent the inlet end of the cavity, an outlet flange extending from the valve body adjacent the outlet end of the cavity.

12. A valve assembly comprising:
    a pipe;
    an air/vacuum valve defining an interior cavity, a float oriented within the interior cavity, the float movable between a lowered position and a raised position; and
    an anti-shock check valve between the pipe and the air/vacuum valve, the anti-shock check valve comprising;
      a valve body, the valve body defining a cavity, the cavity defining an inlet end an outlet end;
      a seat positioned within the cavity; and
      a shaft assembly positioned within the cavity, the shaft assembly comprising a shaft, a collar, a disc, and a spring, the collar selectively repositionable along the shaft to adjust a maximum allowable extension length of the spring, the shaft assembly movable between an open position, wherein the disc is spaced from the seat, and a closed position, wherein the disc is engaged with the seat.

13. The valve assembly of claim 12, wherein the disc defines an outer surface and an inner surface, a hole extending from the outer surface to the inner surface.

14. The valve assembly of claim 12, the spring biasing the shaft assembly to the open position.

15. The valve assembly of claim 12, an inlet flange extending from the valve body adjacent the inlet end of the cavity, the inlet flange connected to the pipe, an outlet flange extending from the valve body adjacent the outlet end of the cavity, the outlet flange connected to the air/vacuum valve.

16. The valve assembly of claim 12, further comprising:
    a body vane assembly, the body vane assembly comprising a body vane, the body vane defining a proximal end joined with the valve body and a distal end joined with a first annular ring, the first annular ring defining a first bore therethrough; and
    a seat vane assembly, the seat vane assembly comprising a seat vane, the seat vane defining a proximal end joined with the seat and a distal end joined with a second annular ring, the second annular ring defining a second bore therethrough.

17. The valve assembly of claim 16, the shaft configured to extend through the first bore and the second bore, the collar disposed on the shaft between the body vane assembly and seat vane assembly.

18. A method for adjusting an anti-shock check valve comprising:
- disengaging a collar from a shaft at a first location along the shaft, the collar defining an annular body, the annular body defining a first end and a second end facing the first end, a space defined between the first and second ends, a hinge formed in the annular body;
- repositioning the collar along the shaft to adjust a maximum allowable extension length of a spring; and
- engaging the collar with the shaft at a second location along the shaft.

19. The method of adjusting an anti-shock check valve of claim 18, wherein disengaging a collar from a shaft at a first location along the shaft comprises loosening a set screw of the collar to move the first end away from the second end, and wherein engaging the collar with the shaft a second location along the shaft comprises tightening the set screw of the collar to move the first end towards the second end.

\* \* \* \* \*